United States Patent
Weng et al.

(10) Patent No.: US 7,474,495 B2
(45) Date of Patent: Jan. 6, 2009

(54) PIEZOELECTRIC MICRO-ACTUATOR FOR MAGNETIC TAPE READ/WRITE HEAD

(75) Inventors: Ming-chih Weng, Los Angeles, CA (US); Turguy Goker, Solana Beach, CA (US); Ashok Nayak, Glendora, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 11/676,873

(22) Filed: Feb. 20, 2007

(65) Prior Publication Data

US 2008/0198506 A1    Aug. 21, 2008

(51) Int. Cl.
G11B 5/584    (2006.01)
G11B 21/02    (2006.01)

(52) U.S. Cl. ............... 360/77.13; 360/75; 360/101; 360/291

(58) Field of Classification Search ............ None
See application file for complete search history.

(56) References Cited

U.S. PATENT DOCUMENTS

| | | | |
|---|---|---|---|
| 3,526,726 A | 9/1970 | Corbelt | |
| 4,099,211 A | 7/1978 | Hathaway | |
| 4,295,172 A | 10/1981 | Fukada | |
| 4,438,469 A | 3/1984 | Ohba et al. | |
| 5,191,492 A | 3/1993 | Nayak | |
| 5,438,469 A | 8/1995 | Rudi | |
| 5,729,077 A | 3/1998 | Newnham et al. | |
| 6,075,678 A | 6/2000 | Saliba | |
| 6,157,522 A | 12/2000 | Murphy | |
| 6,222,698 B1 | 4/2001 | Barndt et al. | |
| 6,233,124 B1 | 5/2001 | Budde | |
| 6,327,120 B1 | 12/2001 | Koganezawa | |
| 6,404,598 B1 | 6/2002 | Nayak | |
| 6,411,474 B1 * | 6/2002 | Anderson | 360/291 |
| 7,133,261 B2 * | 11/2006 | Biskeborn | 360/291 |
| 7,221,534 B2 * | 5/2007 | Anderson et al. | 360/77.12 |
| 2005/0201017 A1 * | 9/2005 | Koga et al. | 360/291 |
| 2006/0126212 A1 * | 6/2006 | Anderson et al. | 360/75 |

OTHER PUBLICATIONS

U.S. Appl. No. 11/506,968, filed Aug. 17, 2006, Nayak.

* cited by examiner

Primary Examiner—Jason C Olson
(74) Attorney, Agent, or Firm—Baker Botts L.L.P.

(57) ABSTRACT

The claimed embodiments provide methods, apparatuses and systems directed to a servo-actuated positioner for a read/write head that uses a piezoelectric super fine actuator that moves the read/write head to maintain alignment with data tracks on a magnetic tape. The servo-actuated positioner, in one implementation, uses flexures to mechanically support the read/write head. Piezoelectric elements are attached to the flexures in strategic locations to effect movement of the read/write head when the elements are actuated. This configuration achieves a large actuator motion using small piezoelectric elements. Additionally, manufacturability is improved since the piezoelectric elements, which are typically brittle, are attached to the mechanically robust flexures.

13 Claims, 14 Drawing Sheets

US 7,474,495 B2

PIEZOELECTRIC MICRO-ACTUATOR FOR MAGNETIC TAPE READ/WRITE HEAD

TECHNICAL FIELD

The present invention relates generally to micro-actuators used in linear tape drive systems

BACKGROUND

Linear tape drive systems provide for high-density recording on multiple tracks of a magnetic tape. In certain arrangements, parallel tracks extend along a longitudinal direction of the magnetic tape. During recording or playback, the read/write elements of the head should be aligned with the desired track as the tape moves in a longitudinal direction across the read/write bump. Closed loop positioners are often used in tape systems having higher track densities, In high-density tape systems, the tape may wander in the lateral direction as it moves in the longitudinal direction across a read/write head, which results in an offset between the read/write head and the track center line. To avoid these types of problems, tape cartridges for high-density tape drives are preformatted with information often called servo information, which is used to maintain the correct lateral position of the tape with respect to the read/write head. Servo information provides the system with feedback to determine the continuous position of the tape relative to the head. Analysis of the servo signals allows for a determination of an offset and the distance of the offset between the track and the head. Based on the information, the head is moved by a positioner to the center line of the track so that write/read operations can occur properly. Closed loop positioners generally use fine positioners to move the head during a write/read operation. These fine positioners are used to maintain the position of the head at the center line of the track under a closed loop servo control using the preformatted servo information on the tape.

Linear Tape Open ("LTO") is a computer storage magnetic tape format that employs a servo-based, closed loop control mechanism. The LTO roadmap calls for successive increases in capacity and speed. As track densities increase with each new generation of LTO tape drives, the ability to precisely control the read/write head relative to the magnetic tape also needs to be improved. Due to this, a need exists in the ad for improved head positioner systems.

SUMMARY

The following embodiments and aspects thereof are described and illustrated in conjunction with systems, apparatuses and methods which are meant to be exemplary and illustrative, not limiting In scope. In various embodiments, one or more of the above-described problems have been reduced or eliminated.

The claimed embodiments provide methods, apparatuses and systems directed to a servo-actuated positioner for a read/write head that uses a piezoelectric super fine actuator that moves the read/write head to maintain alignment with data tracks on a magnetic tape. The servo-actuated positioner, in one implementation, uses flexures to mechanically support the read/write head. Piezoelectric elements are attached to the flexures in strategic locations to effect movement of the read/write head when the elements are actuated. This configuration achieves a large actuator motion using small piezoelectric elements. Additionally, manufacturability is improved since the piezoelectric elements, which are typically brittle, are attached to the mechanically robust flexures.

In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
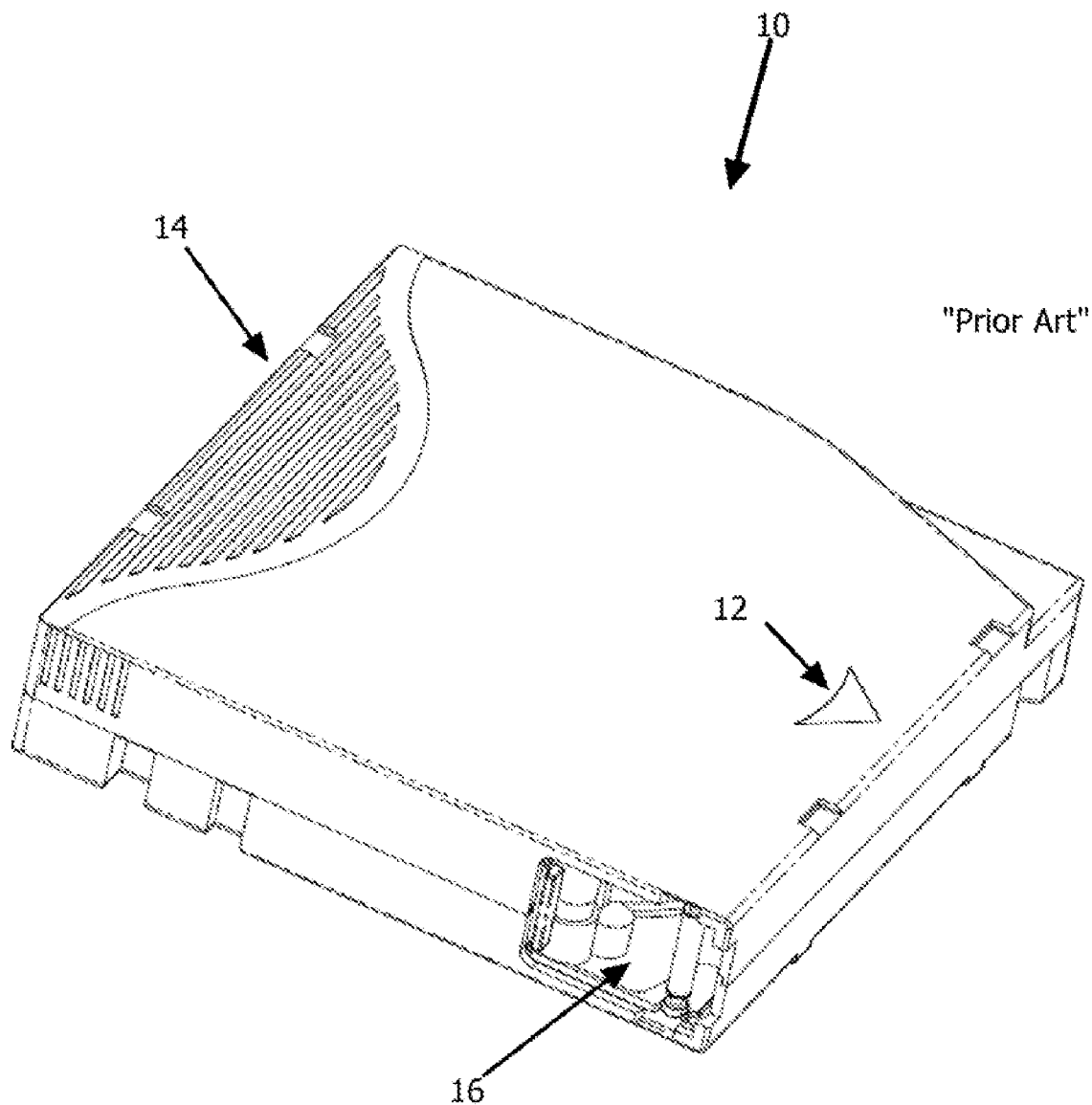
FIG. 1 illustrates a typical LTO tape cartridge.
Figure 2:
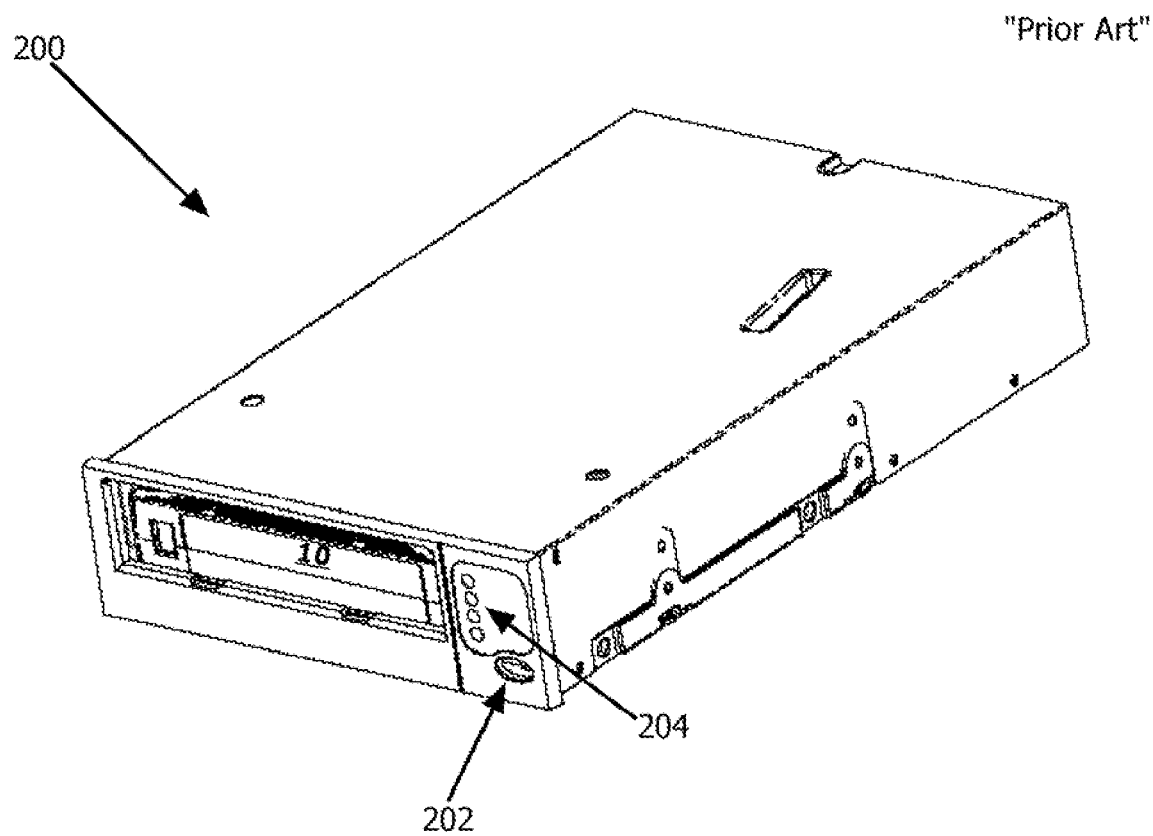
FIG. 2 illustrates a typical LTO tape drive housing with the cartridge of FIG. 1 inserted.

FIG. 1 illustrates a typical LTO tape cartridge 10 and FIG. 2 illustrates a typical LTO tape drive housing 200 with the cartridge 10 of FIG. 1 inserted. Cartridge 10 is inserted into drive 200 in a direction specified by arrow 12. Cartridge 10 also includes grip lines 14 for easy handling. Drive 200 includes an eject button 202 and various indicators 204. The drive 200 may be designed to fit into a 5.25 inch form factor for installation into a bay of a desktop or server box. Of course, other implementations are possible. For example, the drive 200 may be a stand-alone unit, such as a desktop drive that is external from a host computing system.

Figure 3:
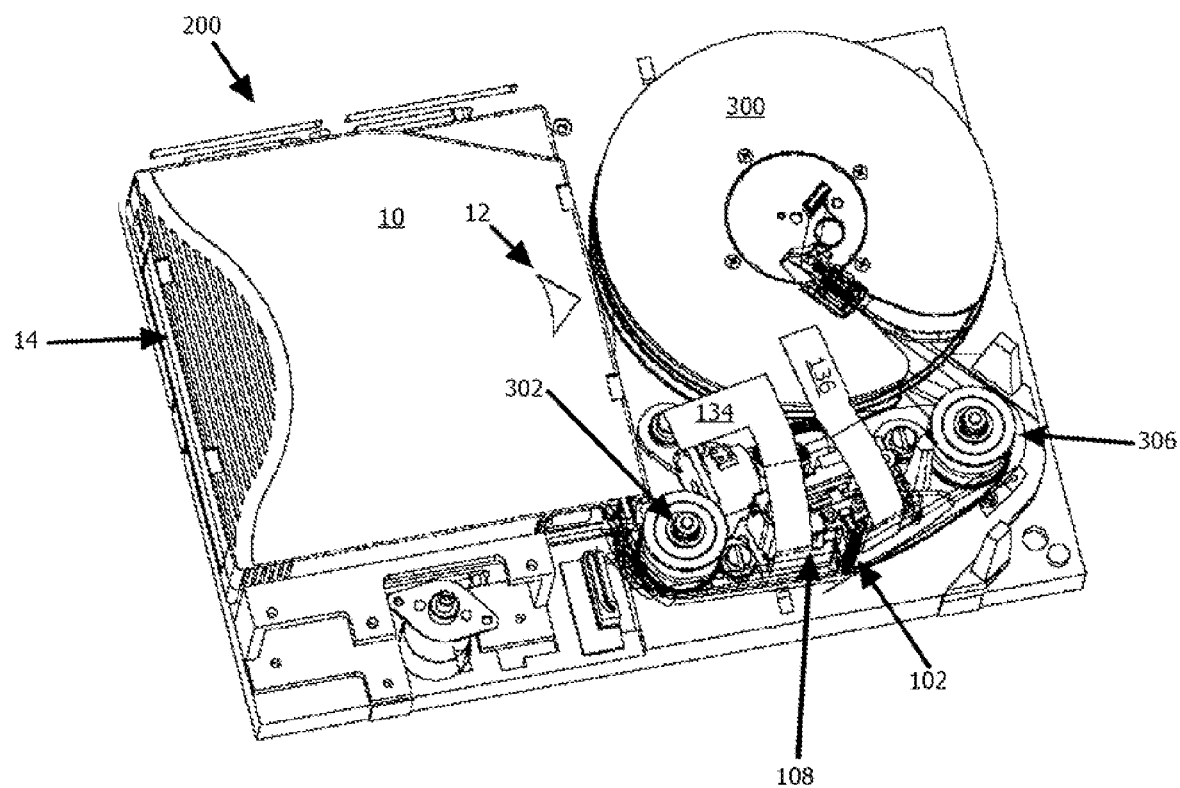
FIG. 3 is a top-down view of the cartridge inserted into the tape drive which includes an actuator assembly of the claimed embodiments.

FIG. 3 is a top-down view of the cartridge 10 inserted into the tape drive 200 which includes an actuator assembly of the claimed embodiments. A full description of the various components of drive 200 is intentionally not included in order to not unnecessarily obscure the claimed embodiments. However, some of the nor components include a take-up hub 300, various tape-threading roller guides (302, 306), read/write head 102 and flex cables (134, 136). Drive 200 will also typically contain one or more processors, a memory and a controller. Read/write head 102 is typically attached to the actuator assembly whose location is generally indicated by arrow 108. The actuator assembly's general purpose is to correctly orient the read/write head 102 in relation to a magnetic tape. This is accomplished, in part, by moving the read/write head 102 up or down in a direction substantially perpendicular to a magnetic tape travel path.

Figure 4:
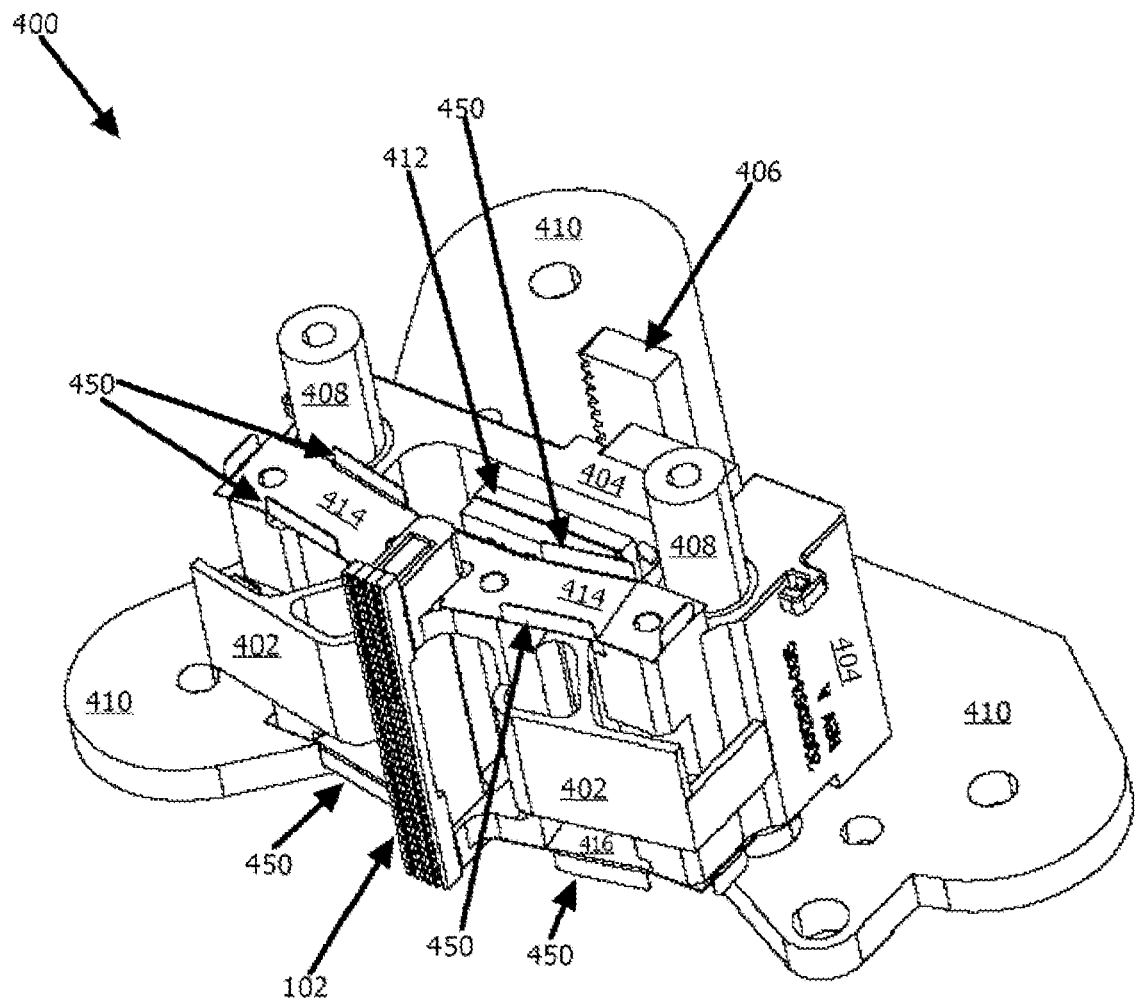
FIG. 4 is a perspective view of an example actuator assembly.

FIG. 4 is a perspective view of an example actuator assembly 400 which can be utilized by the claimed embodiments. The actuator assembly 400 includes the read/write head 102, and a head carriage 402. The read/write head 102 can be retained by the head carriage 402 by a fastener such as an adhesive, an interference fit, mechanical fasteners such as screws, etc. The actuator assembly 400 further includes a coarse actuator and a fine actuator. In one implementation, the head carriage 402 is operably attached to the fine actuator, while the fine actuator is attached to the coarse actuator. In one implementation, the coarse actuator comprises an actuator base 404 (to which the head carriage 402 and fine actuator are attached). The coarse actuator, in one implementation, includes a coarse positioner 406 that displaces the actuator base 404 along shafts 408 that protrude from base plate assembly 410. In one implementation, the coarse actuator translates the entire fine actuator across the tape for a travel distance of about 9 mm to, for example, move read/write head 102 between tracks. Read/write head 102 may include one to several bumps and each bump will usually include a plurality of read and write elements.

Figure 5A:
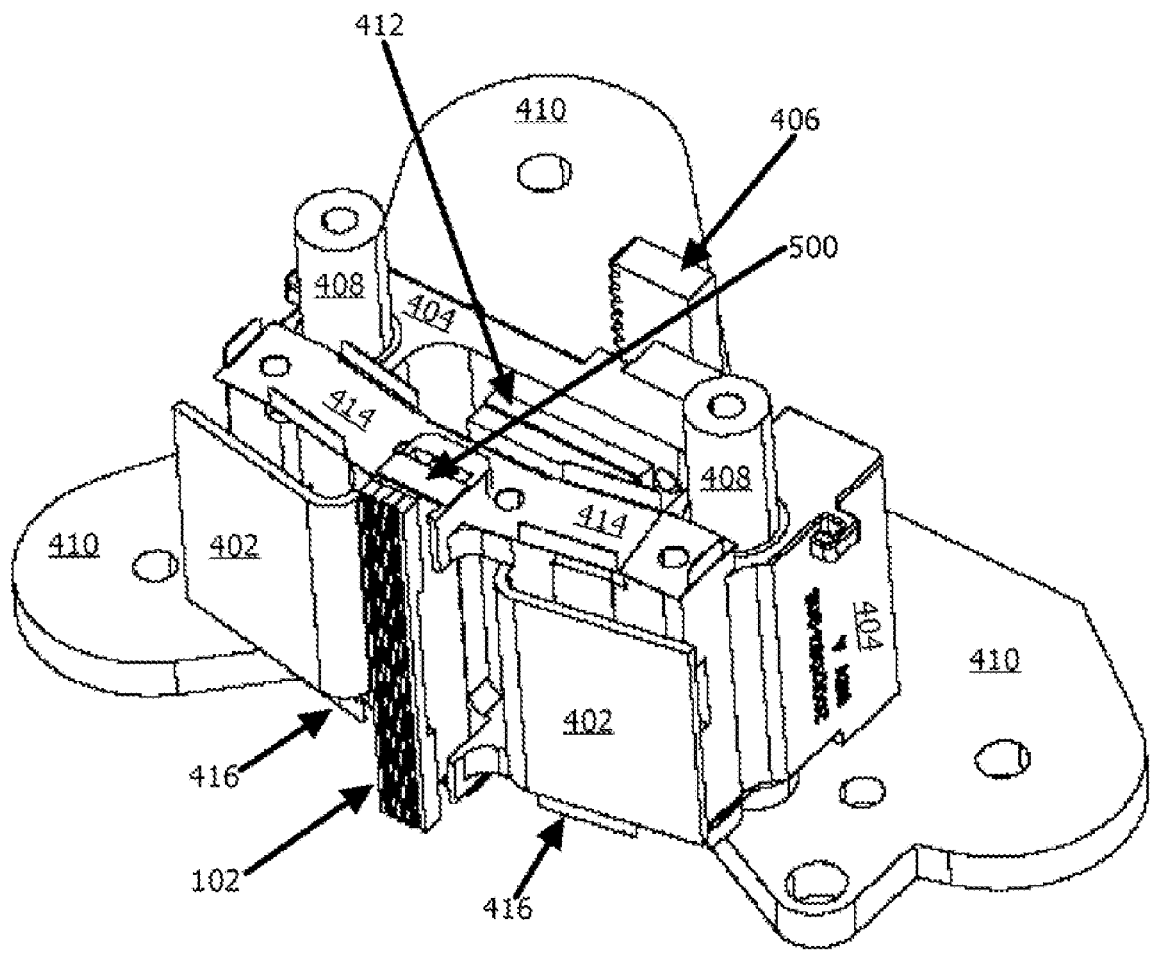
FIGS. 5A-5C are various views of an actuator assembly with a bimorph piezoelectric micro-actuator, in accordance with an example embodiment.
Figure 5B:
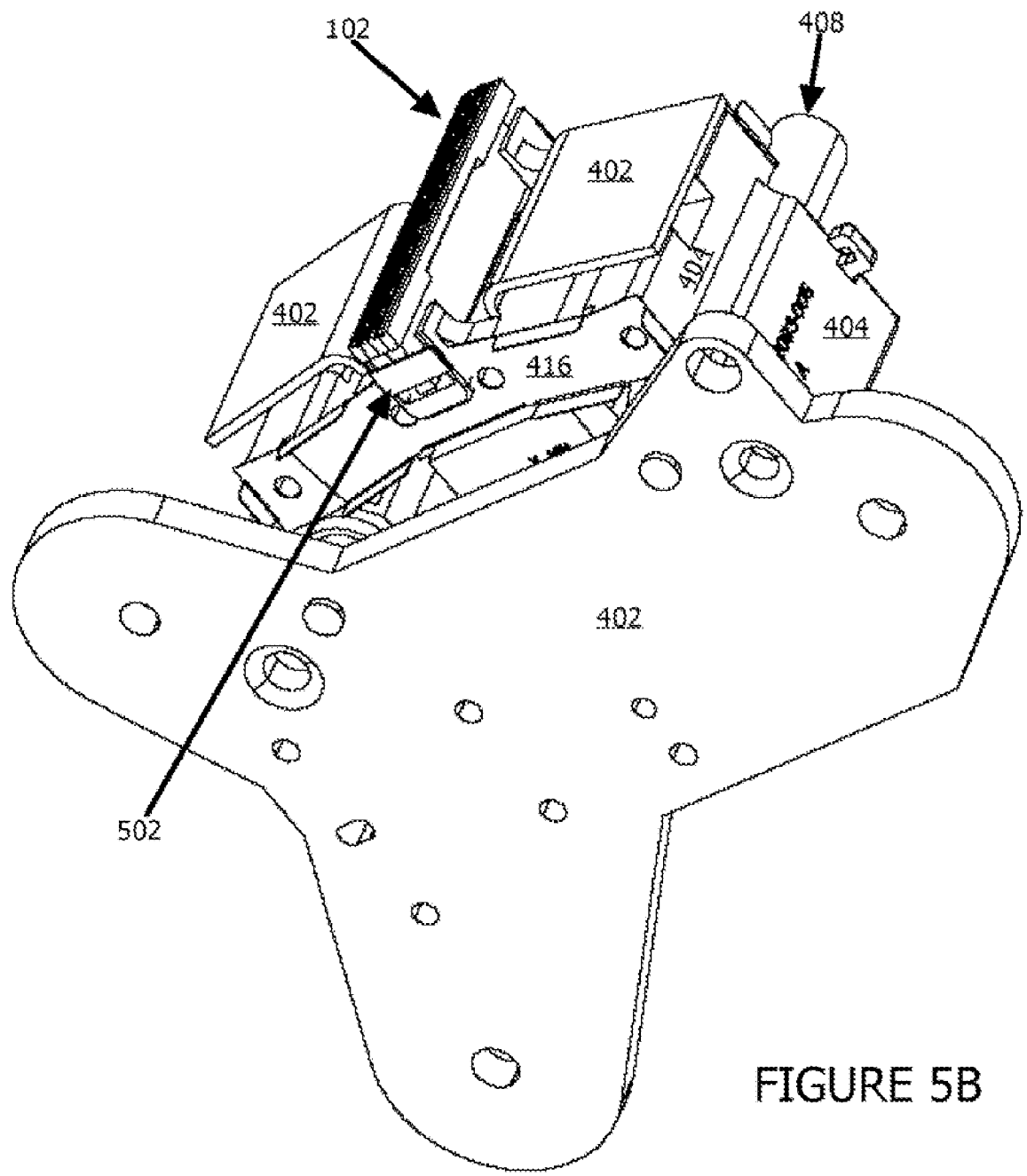
Figure 7A:
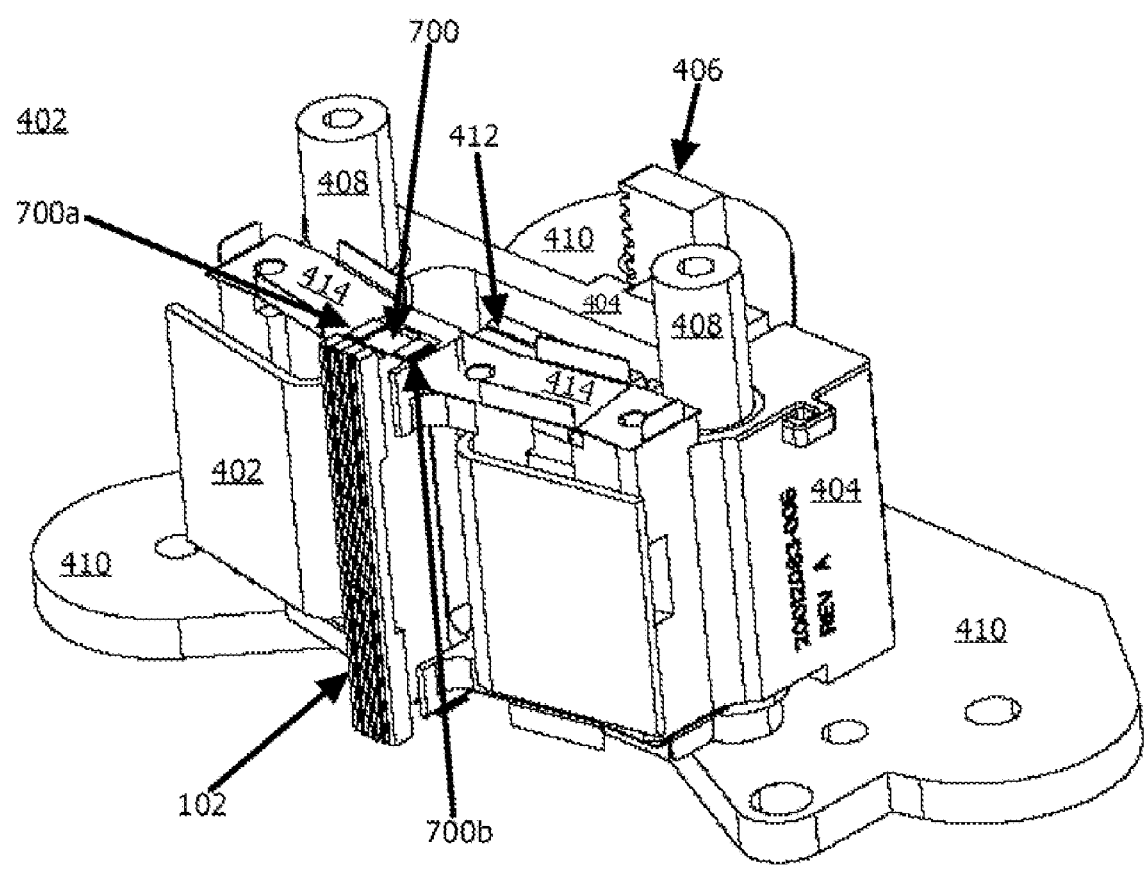
FIGS. 7A-7C are various views of an actuator assembly with a monomorph piezoelectric super fine actuator attached to flexures, in accordance with an example embodiment.
Figure 7B:
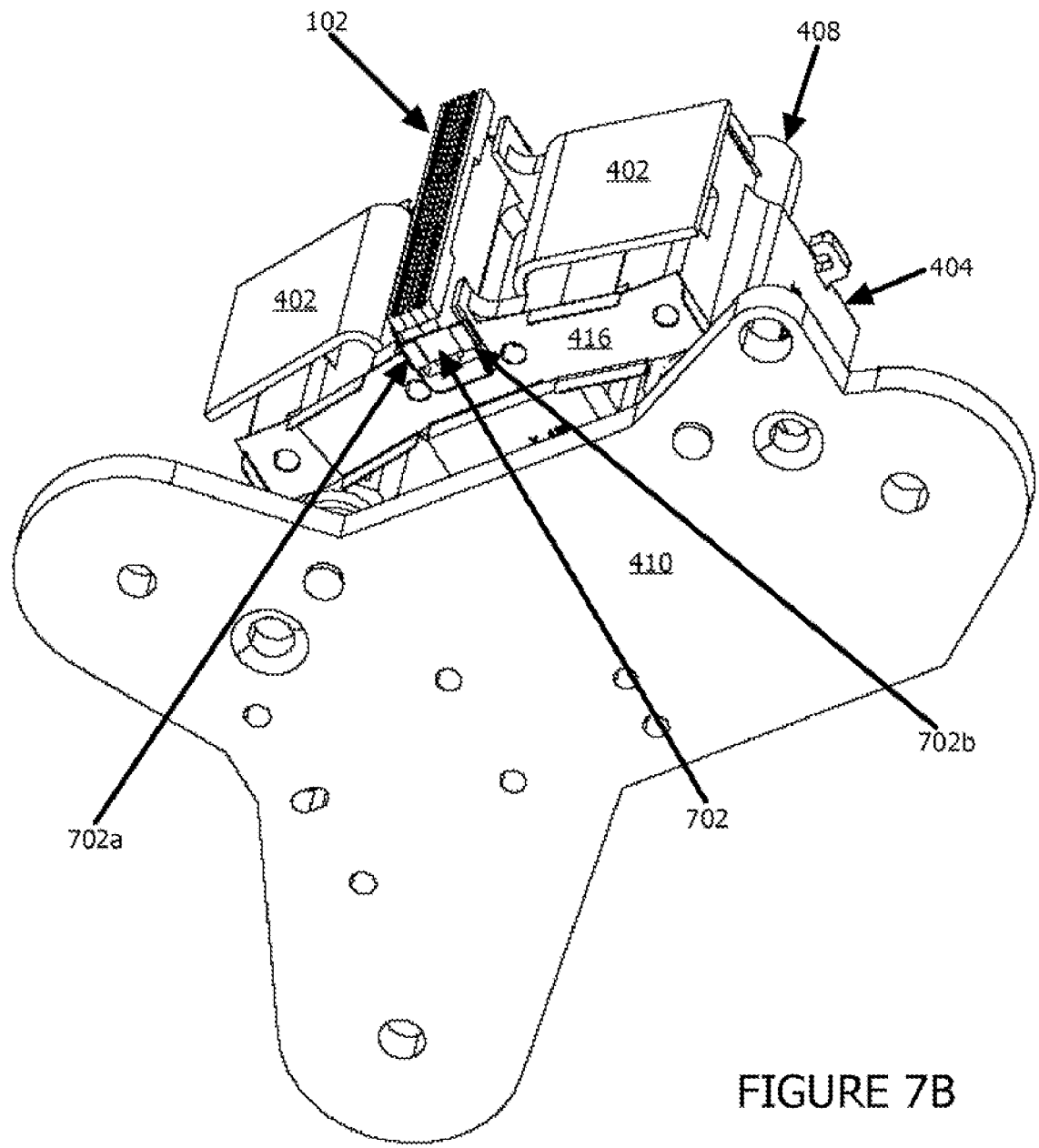

The fine actuator generally includes the actuator base 404, head carriage 402, read/write head 102, voice coil motor 412 and first and second flexure springs (414, 416—see FIGS. 5B and 7B for fuller views of the second flexure spring 416). Flexures 414 and 416 further include side wings 450 which help to stiffen the flexures in order to increase flexure resonance frequencies. The coarse actuator generally includes the base plate assembly 410, the shafts 408, the coarse positioner rack 406 and the actuator base 404.

The fine actuator controls a head carriage assembly (typically comprising the read/write head 102 and the head carriage 402) relative to actuator base 404, using a voice coil motor ("VCM") assembly. The VCM assembly includes a voice coil (not shown) which is attached to the head carriage 402 to translate with the head carriage 402, while a magnetic housing assembly 412 is attached to the actuator base 404. The voice coil is suspended in a magnetic field produced by one or more magnets in the magnetic housing assembly 412 of the voice coil motor. In one implementation, the fine actuator moves the read/write head 102 based on analysis of the servo signals, read from servo read elements disposed over corresponding servo tracks of a moving tape, to keep the read/write head 102 in substantial alignment with a selected track. In one implementation, the fine actuator can move the read/write head 102 a distance of about ±60 to ±100 microns.

Aspects of the claimed embodiments provide for one or more of the following advantages. Embodiments of the invention allow for more precise control of the read/write head 102 than known fine actuators can typically provide. In addition, some embodiments provide positioner systems with increased high frequency response by allowing for additional decreases in the moving mass displaced by the positioner mechanisms under closed-loop servo controls These and other advantages are accomplished, in one implementation, through a "super fine" actuator which utilizes piezoelectric elements and flexures. Since the typically brittle piezoelectric material is attached to mechanically robust flexures, manufacturability is improved. In one implementation, the disclosed super fine actuators are operative to move the read/write head a distance of about 5 microns.

All of the following disclosed embodiments are used in conjunction with control logic operative to control a superfine and a fine actuator under closed loop servo control. A variety of algorithms can be used to move each of the super fine and the fine actuators in response to lateral movement detected by monitoring servo signals.

Figure 5C:
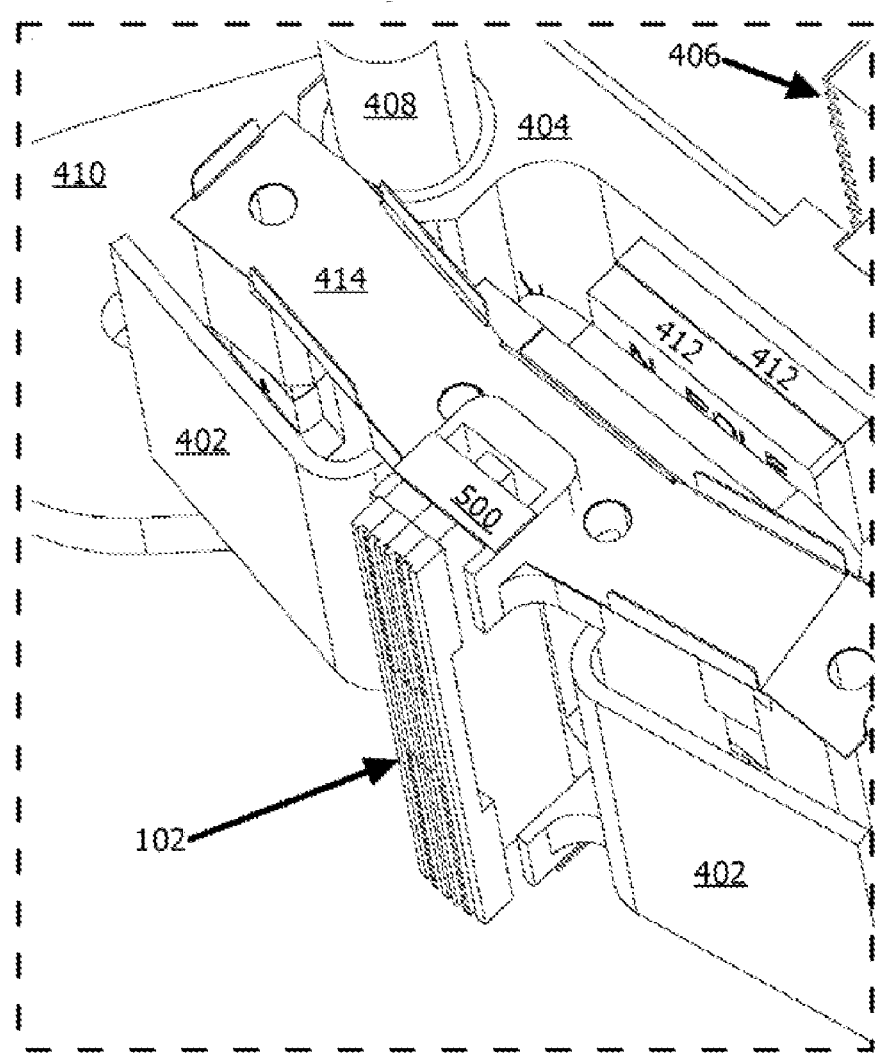
Figure 6:
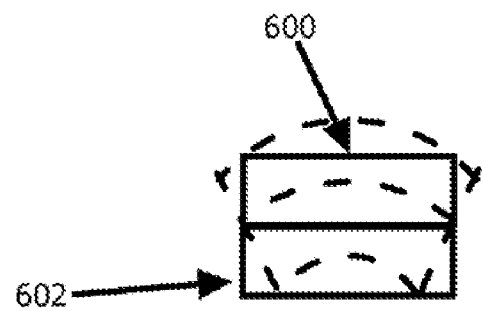
FIG. 6 is a diagram illustrating characteristics of bimorph piezoelectric material, in accordance with an example embodiment.

A first embodiment provides for a super fine actuator made up of two "bimorph" layers of piezoelectric material (500, 502) attached to the head carriage 402 at distal ends of the read/write head 102 and is illustrated via FIGS. 5A-5C. Read/write head 102 is movable relative to head carriage 402 by activation of piezoelectric actuation layers. The term "bimorph" refers to a double layer of piezoelectric materials as shown in FIG. 6. The layers (600, 602) are arranged such that the top layer 600 extends and the bottom layer 602 contracts, or vice versa, when the layers (600, 602) are electrically excited. Due to this arrangement, the combined bimorph layers will bend upwards when the top layer 600 extends and the bottom layer 602 contracts as indicated by the dashed lines. The total displacement of the read/write head 102 through activation of the piezoelectric layers, in one implementation, can be about ±4 to ±5 microns.

Portion 502 of the super fine actuator is attached to the head carriage 402 at the bottom distal end of the read/write head 102 such that later 600 contacts the head carriage 402. For portion 500 at the opposite, top distal end of the read/write head 102, layer 602 is in contact with the head carriage 402 It should be noted that in FIG. 5C that it may appear that the portion 500 of the super fine actuator is attached to the flexure 414. That is not the case, however, as the portion 500 is indeed attached to the head carriage 402.

Figure 7C:
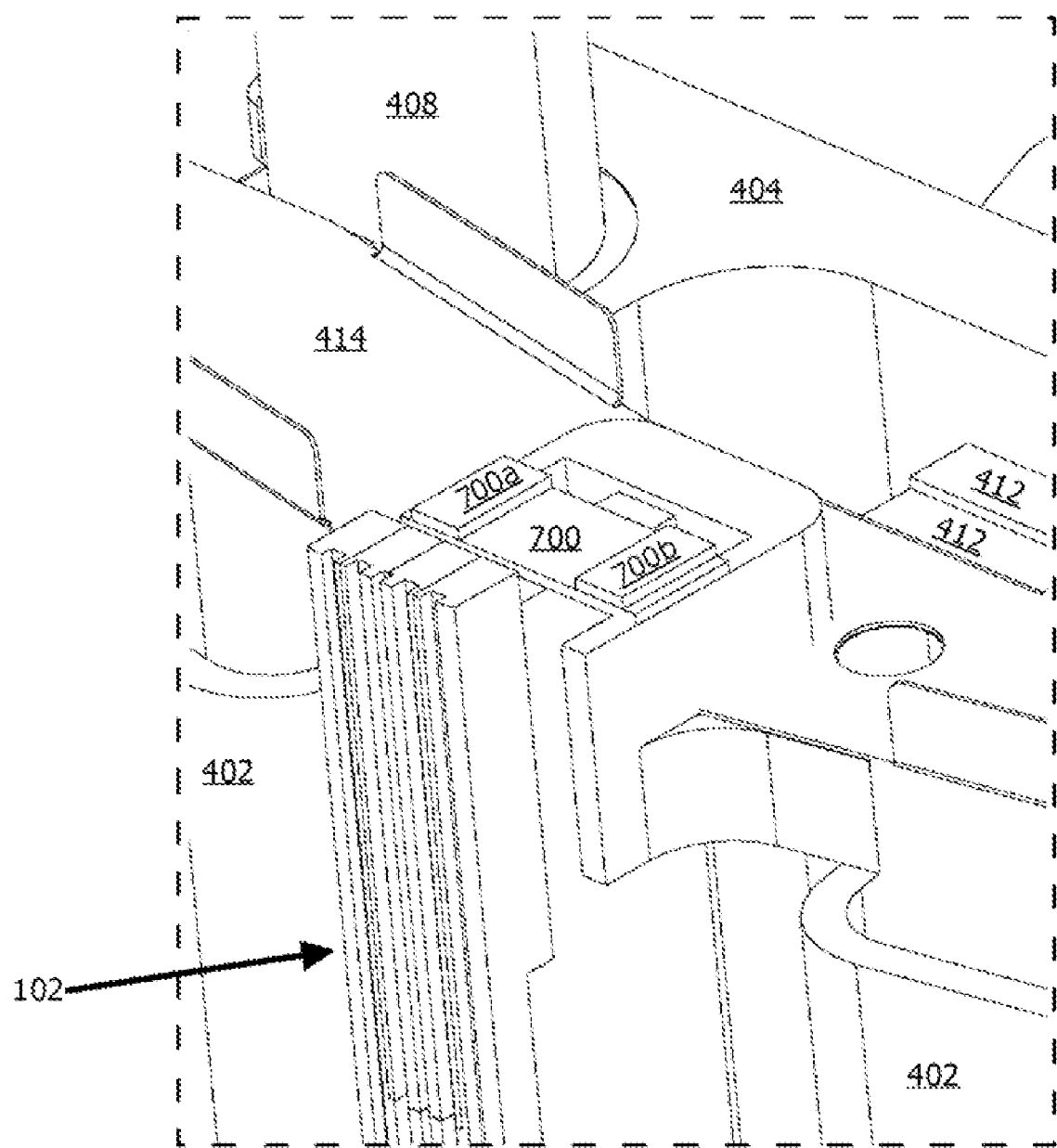
Figure 9:
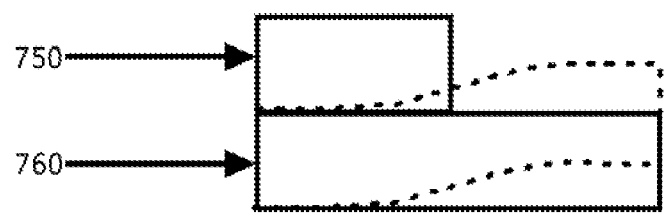
FIG. 9 is a diagram illustrating characteristics of monomorph piezoelectric material on a flexure, in accordance with an example embodiment.

The super fine actuator may assume different configurations. In another implementation, as shown in FIGS. 7A-7C, a super fine actuator is formed from flexures 700 and 702 that are placed on the head carriage 402 at distal ends of the read/write head 102 and each of the additional flexures have two pieces of monomorph (single layer) piezoelectric material (700a, 700b, 702a, 702b). An electrically excited monomorph piece of piezoelectric material will change length when electrically stimulated. Since two pieces of the monomorph material (700a and 700b, 702a and 702b) are placed on the flexures (700, 702), when they contract, they will tend to bend the flexure upward such as indicated by the dotted lines in FIG. 9 which is a cross section of a flexure 760 and monomorph piezoelectric material 750 used in an implementation similar to the one of FIGS. 7A-7C. Similar to FIG. 5C, it should be noted that the view of FIG. 7C may appear to indicate that the flexure 700 is attached to the flexure 414. Flexure 700 is actually attached to the head carriage 402.

Figure 8A:
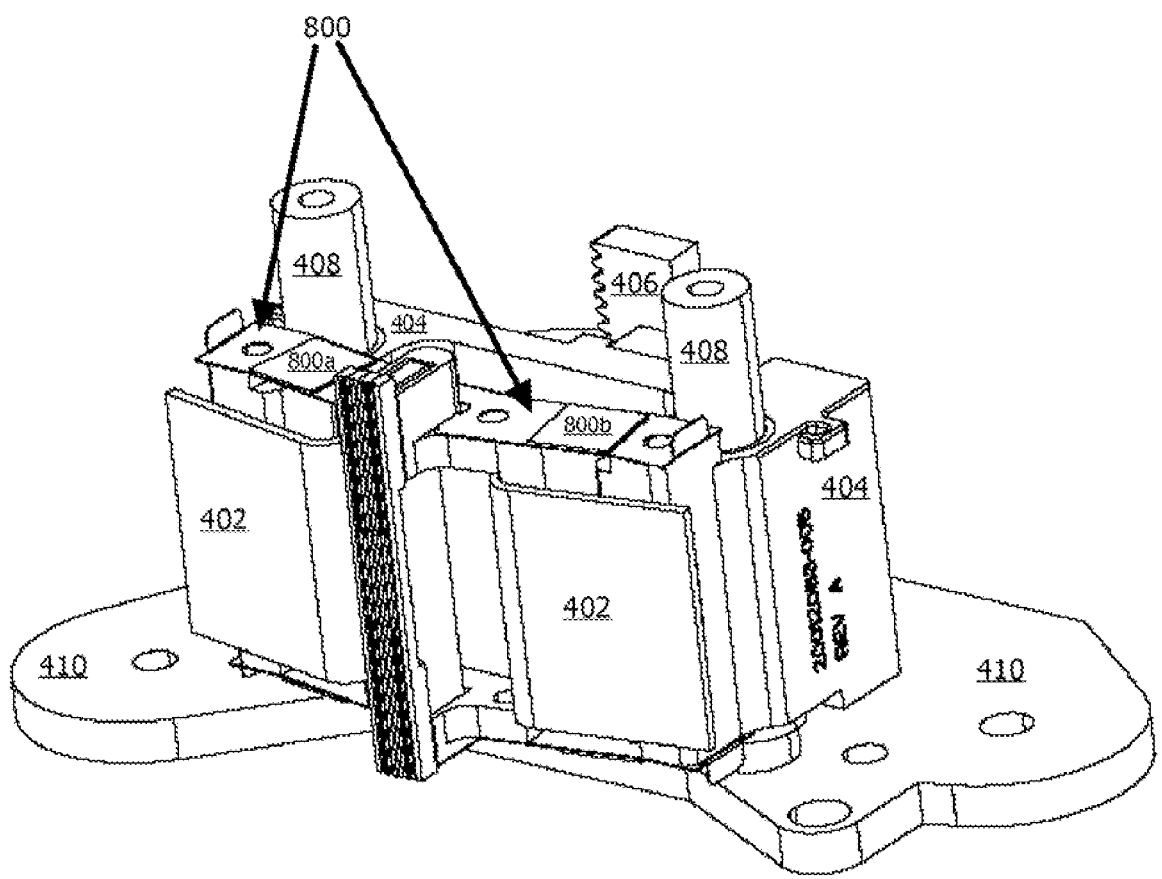
FIGS. 8A-8B are various views of an actuator assembly with a different monomorph piezoelectric super fine actuator attached to a flexure, in accordance with an example embodiment.
Figure 8B:
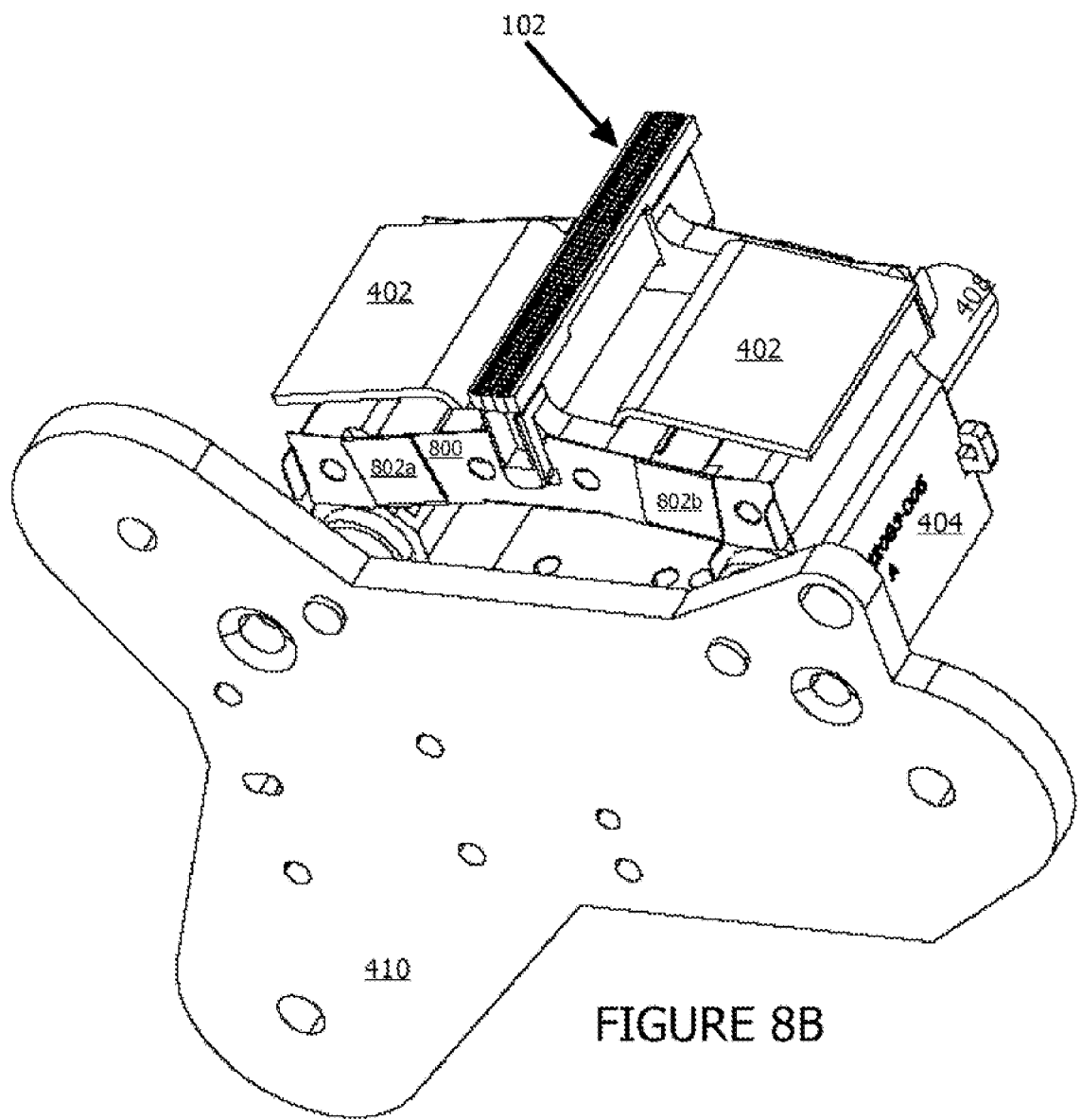

In another implementation, piezoelectric material can be disposed on other components of the positioner system to create a superfine actuator. FIGS. 8A-8B illustrate an implementation wherein a super fine actuator is made from tour pieces of monomorph piezoelectric material (800a and 800b, 802a and 802b) that are placed on flexures 800 and 802. Similar to the implementation of FIGS. 7A-7C, FIG. 9 indicates how an electrically stimulated monomorph piezoelectric material 750 will bend a flexure 760 as indicated by the dotted lines. In this implementation, the read/write head is fixed relative to the head carriage 402.

The implementation of FIGS. 8A-8B do not utilize side wings on the flexures 800 and 802 to facilitate displacement of the flexures and head carriage assembly by the piezoelectric actuators. Specifically, side wings such as side wings 450 as shown in FIG. 4. Additionally, the configurations of FIGS. 8A-8B can be used with or without a voice coil motor 412 and related voice coil. Without a voice coil motor, an overall moving mass is reduced and frequency response is increased.

Figure 10:
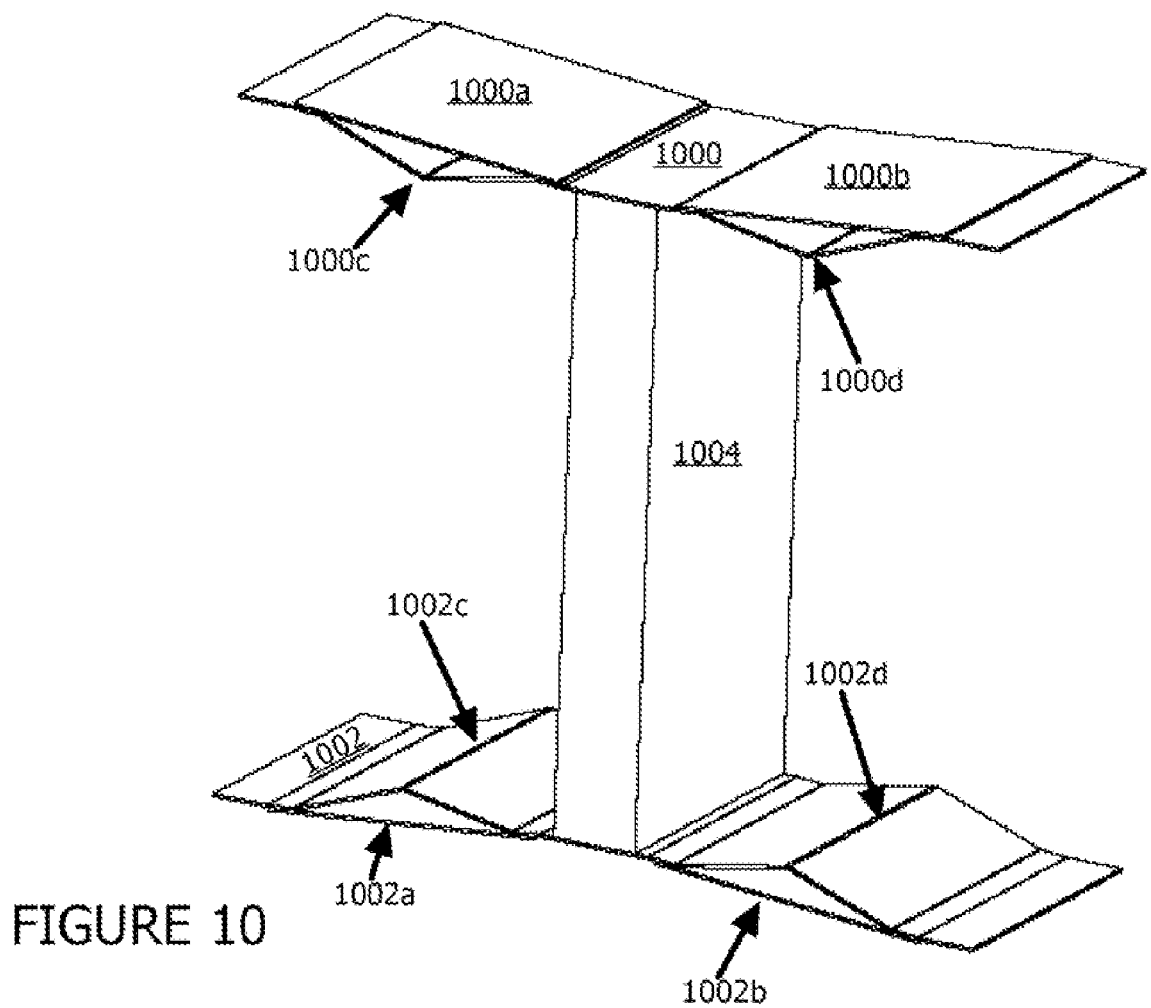
FIG. 10 is a view of another monomorph piezoelectric super fine actuator on a modified flexure, in accordance with an example embodiment.
Figure 11:
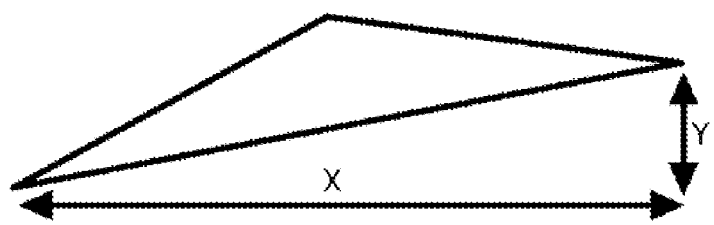
FIG. 11 is a diagram illustrating mechanical amplification characteristics of the super fine actuator of FIG. 10.

Other implementations of the invention can involve modified flexure designs. For example, yet another implementation of a super fine actuator is conceptually disclosed via FIG. 10 which illustrates top and bottom flexures (1000, 1002) separated by a head block 1004 to which a read/write head can be attached. On each flexure (1000, 1002) are two pieces of monomorph piezoelectric material (1000a and 1000b, 1002a and 1002b). Each of the flexures (1000, 1002) are modified at each piece of monomorph piezoelectric material (1000a, 1000b, 1002a, 1002b) to form angles (1000c, 1000d, 1002c, 1002d) where flexure portions meet at these points at an angle. The mechanical amplification of the flexure is defined by the tilt angle of the monomorph piezoelectric material (1000a, 1000b, 1002a, 1002b). This is further demonstrated via FIG. 11 wherein the mechanical amplification for the flexure is proportional to the distance "x" divided by the distance "y." In one implementation, a general shape of the region between the flexures (1000, 1002) and the monomorph piezoelectric materials (1000a, 1000b, 1002a, 10002b) is generally triangle-shaped, The conceptual representation of FIG. 10 can be incorporated into an actual device such as the generic actuator of FIG. 4. For example, the flexures (1000, 1002) can be mounted to a coarse actuator to move a read/write head and head carriage combination relative to a coarse actuator base.

Figure 12:
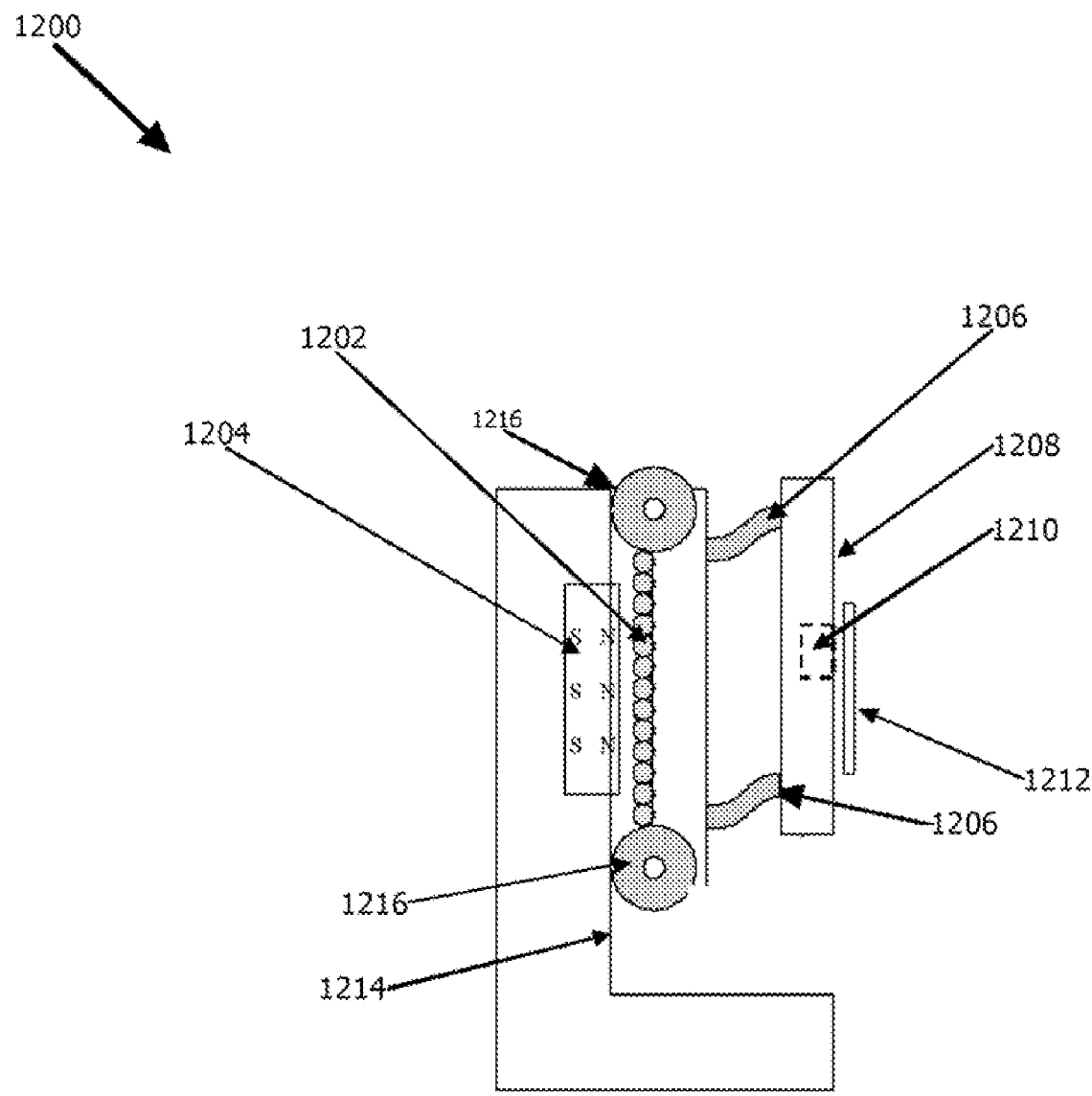
FIG. 12 is a schematic cross-section of an example single stage VCM with a free moving mass that can be utilized by the claimed embodiments.

Another example of an actuator that may employ the claimed embodiments is shown in FIG. 12 which is a schematic cross-section of a single stage VCM system 1200 with a free moving mass Included in system 1200 is an electric coil 1202, a magnet 1204, a piezoelectric super fine actuator 1206, a read/write head 1208, a read/write element 1210 which can read data from or write data to tape 1212, a bearing surface 1214 and rollers 1216. Typically, the VCM positioner portion of system 1200 can move the read/write head 1208 in the range of about 9000 microns while the piezoelectric super fine actuator 1206 can move the read/write head 1208 in the range of about 5 microns. Any of the previously described embodiments may be implemented via the piezoelectric super fine actuator 1206.

Implementations of the invention can be configured to enjoy a number of advantages over the prior art such as a reduced moving mass, more precise placement control of the read write head via the super fine actuator and improvements in manufacturability by attaching typically brittle piezoelectric material to mechanically robust flexures.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An actuator assembly, for use in a tape drive, comprising:
   a head carriage;
   a head movably attached at opposite distal ends thereof to the head carriage by first and second flexures;
   a fine actuator operative to move the head carriage in a direction substantially perpendicular to a media travel path;
   a coarse actuator operative to move the fine actuator in the direction substantially perpendicular to the media the media travel path;
   a super-fine actuator operative to move the head in the direction substantially perpendicular to the media travel path;
   control logic operative to process servo-based control signals transduced by the head from a data recording medium to separately control the fine actuator and the super-fine actuator to orient the head relative to the data recording medium; and
   wherein the super-fine actuator comprises one or more piezoelectric elements attached to the first flexure.

2. The actuator assembly as recited in claim 1 wherein the super-fine actuator further comprises one or more piezoelectric elements attached to the second flexure.

3. The actuator assembly as recited in claim 1 wherein the one or more piezoelectric elements are monomorph piezoelectric elements.

4. An actuator assembly, for use in a tape drive, comprising:
   a coarse actuator operative to move a read/write head in a direction substantially perpendicular to a magnetic tape travel path;
   a fine actuator operative to move the read/write head in the direction substantially perpendicular to the magnetic tape travel path;
   one or more flexures coupling the fine actuator to the coarse actuator;
   a super-fine actuator operative to move the read/write head in the direction substantially perpendicular to the magnetic tape travel path;
   control logic operative to process servo-based control signals transduced by the read/write head from a magnetic tape to separately control the fine actuator and the super-fine actuator to orient the read/write head relative to the magnetic tape; and
   wherein the super-fine actuator comprises one or more piezoelectric elements disposed on the one or more flexures and operative, when actuated, to displace the flexures and the read/write head.

5. The actuator assembly as recited in claim 4 wherein the one or more flexures are first and second flexures and wherein the one or more piezoelectric elements are first and second pairs of piezoelectric elements, the first pair disposed on the first flexure and the second pair disposed on the second flexure.

6. The actuator assembly as recited in claim 5 wherein the first and second pairs of piezoelectric elements are first and second pairs of monomorph piezoelectric elements.

7. The actuator assembly as recited in claim 4 wherein the one or more flexures are each angled to form a cavity between the one or more flexures and the one or more piezoelectric elements.

8. The actuator assembly as recited in claim 7 wherein the cavity is generally triangle-shaped.

9. The actuator assembly as recited in claim 8 wherein the one or more flexures are first and second flexures and wherein the one or more piezoelectric elements are first and second pairs of piezoelectric elements, the first pair disposed on the first flexure and the second pair disposed on the second flexure.

10. The actuator assembly as recited in claim 9 wherein zeniths of the generally triangle-shaped cavities of the first flexure faces corresponding zeniths of the triangle shaped cavities of the second flexure.

11. The actuator assembly as recited in claim 10 wherein the first and second pairs of piezoelectric elements are first and second pairs of monomorph piezoelectric elements.

12. An actuator assembly, for use in a tape drive, comprising:
- a head carriage;
- a head movably attached at opposite distal ends thereof to the head carriage by first and second piezoelectric elements, wherein the first and second piezoelectric elements are disposed to move the head relative to the head carriage in response to electric signals;
- a fine actuator operative to move the head carriage in a direction substantially perpendicular to a travel path of a recording medium;
- a coarse actuator operative to move the fine actuator in the direction substantially perpendicular to the travel path;
- control logic operative to process servo-based control signals transduced by the head from a recording medium to separately control the fine actuator and first and second piezo-electric elements to orient the head relative to the recording medium.

13. The actuator assembly as recited in claim 12 wherein the first and second piezoelectric elements are bimorph piezoelectric elements.

* * * * *